United States Patent
Petrzilka

[15] 3,668,224
[45] June 6, 1972

[54] PROCESS OF PRODUCING 6A, 10A-TRANS-6A,7,8,10A-TETRAHYDRODIBENZO (B,D)-PYRANS

[72] Inventor: Theodor Petrzilka, 6 Rigistrasse, Erlenbach ZH 8703, Switzerland

[22] Filed: July 2, 1970

[21] Appl. No.: 52,105

Related U.S. Application Data

[62] Division of Ser. No. 760,055, Sept. 16, 1968, abandoned.

[52] U.S. Cl. ............................................260/345.3, 424/283
[51] Int. Cl. .........................................................C07d 7/20
[58] Field of Search................................................260/345.3

[56] References Cited

UNITED STATES PATENTS 3,388,136   6/1968   Taylor et al........................260/345.3

OTHER PUBLICATIONS

Gaoni et al., J. Am. Chem. Soc., Vol. 86, pp. 1646– 1647 (1964)

*Primary Examiner*—John M. Ford
*Attorney*—Granville M. Brumbaugh, Ellen M. Graves, Mark M. Donohue, John E. Dumaresq, Dana M. Raymond, John F. Neary, Jr., James N. Buckner, Frank W. Ford, Jr., Fredrick C. Carver, Richard H. Fuller, Jr., John W. Brumbaugh, George W. Whitney, Allen G. Weise and Francis J. Hone

[57] ABSTRACT

This invention is directed to a process of producing (−)-1-hydroxy-3-n-amyl-6,6,9-trimethyl-6a,10a-trans-6a,7,8,10a-tetrahydrodibenzo(b,d)-pyran and related pyrans from resorcinols, including intermediates therein. The pyrans produced by this invention possess psychotomimetic and analgesic activity.

11 Claims, No Drawings

3,668,224

PROCESS OF PRODUCING 6A, 10A-TRANS-6A,7,8,10A-TETRAHYDRODIBENZO (B,D)-PYRANS

RELATED APPLICATIONS

This application is a divisional application of co-pending application Ser. No. 760,055, filed Sept. 16, 1968, now abandoned.

BACKGROUND OF THE INVENTION

The crude resin obtained from the flowering tops of female plants of several *Cannabis sativa L.* varieties has been known and used as a psychotomimetic agent for many years. The structure of this material known variously as marihuana, hashish, etc. had evaded elucidation for many years. Advanced techniques in the field of molecular structural identification such as nmr have led to the identification of the active ingredients of the various *sativa L.* varieties. Gaoni et al. in *J. Am. Chem. Soc.*, 86, 1646 (1964) identified one of the psychotomimetically active components extracted from varieties of Mexican hemp as:

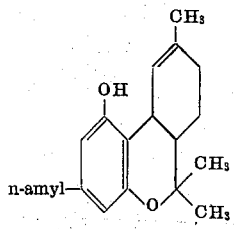

(Ia)

Since the source of hashish or marihuana has been from the extraction of this material from various varieties of plants, it has long been desired to provide an economical means of chemically synthesizing this material, thereby eliminating the necessity of isolating this material from its natural source.

SUMMARY OF THE INVENTION

In accordance with this invention, it has been discovered that compounds of the formula:

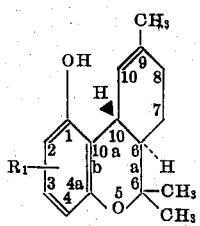

(I)

wherein $R_1$ is hydrogen, halogen, or alkyl containing from one to 10 carbon atoms,
can be synthesized from compounds of the formula:

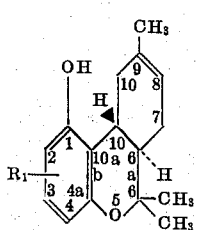

(II)

wherein $R_1$ is as above,
by first treating the compound of the formula II with a hydrohalic acid in the presence of metal halide to form a compound of the formula:

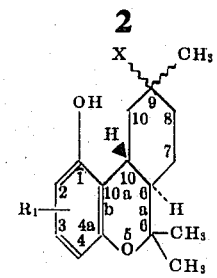

(III)

wherein X is a halogen and $R_1$ is as above.
The compound of formula III is treated with potassium t-amylate in the presence of an aromatic solvent to produce the compound of formula I.

In addition to producing the naturally occuring products of formula I-A above, which have known bactericidal, sedative, analgesic and psychotomimetic properties, the process of this invention produces new and novel pyrans of the formula:

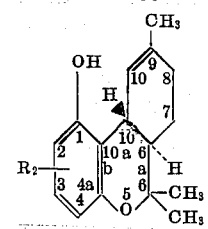

(I-B)

wherein $R_2$ is hydrogen, halogen or alkyl containing from one to 10 carbon atoms with the proviso that when $R_2$ is n-amyl, $R_2$ is not substituted in the three-position of the dibenzo(b,d)-pyran ring.

A preferred class of compounds of formula I-B are those compounds having the formula:

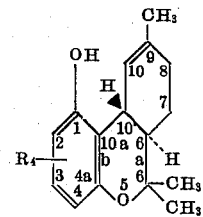

(I-C)

wherein $R_4$ is selected from the group consisting of alkyl radicals having from one to four carbon atoms, alkyl radicals having from six to 10 carbon atoms, and halogen.

The novel compounds of formulas I-B and I-C, exhibit pyschotomimetic, analgesic, sedative and bactericidal properties in like manner as the naturally occurring compound of formula I-A above.

DETAILED DESCRIPTION

The numbering of the rings in compounds of the formulas I, I-A, I-B, II and III is shown for the purpose of convenience. As used throughout the application, the term alkyl comprehends both straight and branched chain alkyl groups containing from one to 10 carbon atoms such as methyl, ethyl, n-propyl, isopropyl, n-butyl, tert-butyl, n-heptyl, n-octyl, etc. In accordance with a preferred embodiment of this invention, $R_1$ is an alkyl residue situated in the three-position of the compound of formula I above. The term halogen includes all four halogens, i.e., chlorine, bromine, fluorine and iodine with chlorine and bromine being preferred.

The compounds of formula I above, are useful as psychotomimetic agents, sedatives and analgesics. The compounds of formula I above are used in the form of conventional pharmaceutical preparations which contain said compounds in connection with conventional pharmaceutical organic or inorganic carrier materials suitable for internal administration. The pharmaceutical compositions containing the compounds of formula I above can be administered parenterally or orally, dosages can be adjusted to individual requirements, for example, these compounds can be administered in dosages of from about 0.1 mg./kg. to about 5 mg./kg. per day. These dosages can be administered in a single dosage form or in divided dosage forms. The pharmaceutical compositions can contain such conventional organic or inorganic inert carrier materials as water, gelatin, lactose, starch, mangesium stearate, talc, vegetable oils, gums, polyalkylene glycols, Vaseline or the like. The pharmaceutical preparations can be in the conventional solid forms such as tablets, dragees, suppositories, capsules or in conventional liquid form such as solutions, suspensions or emulsions. The pharmaceutical compositions can be submitted to conventional pharmaceutical expedients such as sterilization and/or can contain conventional pharmaceutical additives such as preservatives, stabilizing agents, wetting agents, emulsifying agents, salts for adjusting the osmotic pressure, buffers or the like. They can also contain other therapeutically useful materials.

The compounds of formula II can be synthesized by condensing in the presence of an acid agent, a resorcinol of the formula:

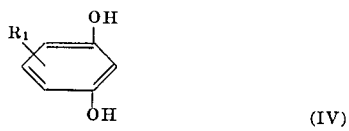

wherein $R_1$ is as above, with either 1,5,8-menthatriene which has the formula:

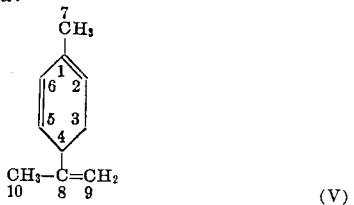

or with (+) p-menthadien (2,8)-ol-(1) which has the general formula:

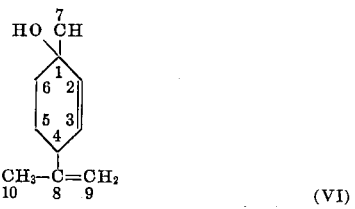

As examples of the compounds of formula IV above that can be utilized in the process of this invention are included resorcinol, 5-ethyl resorcinol, 2-(3,5-dihydroxyphenyl) hexane, 2-(3,5-dihydroxyphenyl)-3-methyl octane, 5-n-propyl resorcinol, 5-methyl resorcinol (orcinol), 5-n-pentyl resorcinol (olivetol), 5-(1-methylbutyl)-resorcinol, 5-n-hexylresorcinol, 5-(1-ethylbutyl)-resorcinol, 5-(1,1-dimethyl-butyl)-resorcinol, 5-(1,2-dimethylbutyl)-resorcinol, 5-n-heptyl-resorcinol, 5-(1-methylhexyl)-resorcinol, 5-n-octylresorcinol, 5-(1-n-propylpentyl)-resorcinol, 5-(1-methyloctyl)-resorcinol and the like.

Any of the isomers of (+)-p-methadienol-(1) of formula VI above which are (+)-cis and (+)-trans-p-menthadienol-(1) as well as the racemic mixture thereof can be utilized in the process of this invention to produce the compound of formula I above.

The condensation of compounds of the formula IV with compounds of the formulas V or VI can be carried out in a conventional inert solvent. Among the preferred solvents are included aliphatic or aromatic hydrocarbons such as petroleum ether, benzene, toluene, etc.; halogenated aliphatic or aromatic hydrocarbons such as methylene chloride, chloroform, carbon tetrachloride, chlorobenzene, etc.; nitrated hydrocarbons such as nitrobenzene, etc.; and ethers such as diethyl ether, tetrahydrofuran, dioxan, etc. Among the other conventional solvents which are preferred to be utilized in the process of this invention are included dimethylformamide, dimethylsulphoxide, or liquid sulphur dioxide.

The reaction to produce the compound of formula II above is carried out in the presence of any conventional organic or inorganic acid agents. Among the preferred acid agents which can be utilized in carrying out the process of this invention are included Lewis acids such as boron trifluoride, zinc chloride, aluminum chloride, tin tetrachloride, etc.; mineral acids such as hydrochloric acid, hydrobromic acid, hydrofluoric acid, sulfuric acid, phosphoric acid, polyphosphoric acids, etc.; and organic acids such as p-toluene sulphonic acid, methane sulphonic acid, formic acid, glacial acetic acid, trifluoroacetic acid, trichloroacetic acid, oxalic acid, maleic acid etc. Sulphur dioxide can be utilized as both the acid medium and the organic solvent. Therefore, when liquid sulphur dioxide is utilized as the solvent medium, the reaction of this invention will take place without the addition of any other acid agent.

In carrying out the reaction to produce the compound of formula II above, temperature and pressure are not critical and this reaction can be carried out at room temperature and atmospheric pressure. If desired, lower or elevated temperatures can be utilized. This condensation reaction is advantageously effected at a temperature of from about 0° C. to about 120° C. In a preferred embodiment of this invention, the reaction is particularly preferably carried out in the presence of p-toluene-sulphonic acid in benzene by heating to a temperature of about 80° C. for 2 hours under reflux conditions.

The compounds of formula III above are prepared from the compound of formula II above by treating the compound of formula II above with a hydrohalic acid in the presence of a metal halide In this reaction, the halide group of the metal halide should be the same as the halide group of the acid halide. The metal halide can be formed from any Group II metal, Group III and Group IV metal of the periodic chart. Among the metal halides which can be utilized are included aluminum bromide, aluminum chloride, stannic chloride, boron trifluoride, magnesium chloride, titanium chloride, ferric chloride, etc. The preferred metal halide utilized in accordance with this invention is zinc chloride. Any conventional hydrohalic acid such as hydrochloric, hydrobromic, etc can be utilized. Generally, this reaction is carried out in the presence of an inert organic solvent. Any conventional inert organic solvent can be utilized. The preferred solvents are the halogenated hydrocarbon solvents such as methylene chloride. In carrying out this reaction, temperature and pressure are not critical, and this reaction can be carried out at room temperature and atmospheric pressure. If desired, elevated or lower temperatures can be utilized.

In accordance with a preferred embodiment of this invention, the compound of the formula II above is converted to a compound of the formula III above by treating the compound of the formula II above with zinc chloride in a methylene chloride solution saturated with hydrogen chloride.

In accordance with this invention, compounds of formula III above where $R_1$ is a halo group such as bromine or chlorine are new and novel compounds. In accordance with a preferred embodiment of this invention, $R_1$ is a halo group substituted in the 3-position of the benzo(b,d)-pyran ring of the compound of formula III above.

The conversion of compounds of the formula II above to compounds of the formula I above, is accomplished by treating the compounds of the formula III with potassium t-amylate in the presence of an inert aromatic hydrocarbon solvent. Any conventional aromatic hydrocarbon solvent can be utilized. Among the preferred aromatic hydrocarbon solvents are included toluene, benzene, xylene, etc. The preferred solvent is benzene. In carrying out this reaction, temperature and pressure are not critical and this reaction can be carried out at room temperature and atmospheric pressure. If desired, elevated or reduced temperatures and pressures can be utilized. However, temperatures as low as 0° C. and as high as 100° C. can be utilized depending upon the freezing and boiling point of the solvent. However, It is generally preferred to carry out the reaction at a temperature of 50° to 70° C.

The following examples are illustrative but not limitative of this invention. All temperatures are in degrees centigrade. The ether utilized in the examples is diethyl ether. The pressure utilized in the examples is expressed as mmHg.

EXAMPLE 1

A solution of 360 mg. of olivetol and 270 mg. of (±)-p-menthatriene-(1,5,8) in 7 ml. of liquid sulphur dioxide is allowed to stand at room temperature for 24 hours in a sealed tube. The sulphur dioxide is thereupon evaporated off under a calcium chloride tube. The oily residue is dissolved in diethyl ether. The ether solution is extracted once with dilute sodium hydrogen carbonate and dried over sodium sulphate. After evaporation of the ether, 633 mg. of a yellow resin remains. The yellow resin which is obtained, is chromatographed on 20 g. of silica gel and upon elution with benzene and distillation at high vacuum, 168 mg. of (±)-1-hydroxy-3-n-amyl-6,6,9-trimethyl-6a, 10a-trans-6a,7,10,10a-tetrahydrodibenzo(b,d)-pyran is obtained. The $R_F$ value of the tetrahydrodibenzopyran obtained is 0.46; boiling point 140°–150° C/0.001 mmHg. (silica gel thin layer chromatogram in chloroform).

EXAMPLE 2

A mixture of 450 mg. of olivetol, 380 mg. (+)-cis-p-menthadien-(2,8)-ol-(1) and 58 mg. of p-toluenesulphonic acid monohydrate in 25 ml. of benzene is boiled under reflux for 2 hours. The resulting orange-yellow solution is cooled in an ice-water bath and dissolved in diethyl ether. The ether solution is immediately shaken once with dilute sodium hydrogen carbonate solution and once with sodium chloride solution. The almost completely decolorized ether solution is dried over sodium sulphate. After evaporation of the ether, 818 mg. of a light yellow oil remained. The resulting yellow oil is chromatographed on 35 g. of silica gel and upon elution with benzene and distillation at high vacuum, 384 mg. of (−)-1-hydroxy-3n-amyl-6,6,9-trimethyl-6a,10a-trans-6a,7,10,10a-tetrahydrodibenzo(b,d)-pyran is obtained.

EXAMPLE 3

A mixture of 474 mg. of olivetol, 403 mg. of (+)-trans-p-menthadien-(2,8)-ol(1) and 80 mg. of p-toluenesulphonic acid monohydrate in 25 ml. of benzene is reacted in the manner of Example 2. There resulted 900 mg. of a yellow oil. The resulting yellow oil was chromatographed on 35 g. of silica gel and upon elution with benzene and distillation at high vacuum, 436 mg. of (−)-1-hydroxy-3n-amyl-6,6,9-trimethyl-6a,10a-trans-6a,7,10,10a-tetrahydrodibenzo(b,d)-pyran was obtained having a $R_F$ value (silica gel thin layer chromatogram in chloroform) of 0.51; and a boiling point of 140°–150° C./0.001 mmHg.

EXAMPLE 4

A mixture of 2.6 g. (13.4 mMol) of 2-(3,5- dihydroxy-phenyl) hexane, 2.05 g. (13.4 mMol) of (+)-trans-p-menthadien-(2,8)-ol-(1) and 260 mg. (1.35 mMol) of p-toluenesulphonic acid monohydrate in 60 ml. of benzene is boiled under reflux for 2 ½ hours. The resulting orange solution is cooled in an ice-water bath and dissolved in diethyl ether. The ether solution is immediately shaken once with a dilute sodium hydrogen carbonate solution and once with a sodium chloride solution. The now almost completely colorless ether solution is dried over sodium sulphate. After evaporation of the ether there remains 4.85 g. of a light yellow oil. The resulting oil is chromatographed on 130 g. of silica gel and upon elution with a 1 to 1 by volume mixture of hexane and benzene and drying to constant weight, there is obtained (−)-1-hydroxy-3-[hexyl(2)]-6,6,9-trimethyl-6a,10a-trans-6a,7,10,10a-tetrahydrodibenzo(b,d)-pyran. After distillation under high vacuum the product has an $R_F$ value (silica gel chromatogram in chloroform) of 0.58 and a boiling point of 190° C./0.001 mmHg.

EXAMPLE 5

A mixture of 2.16 g. (9.15 mMol) of 2-(3,5-dihydroxyphenyl)-3-methyl octane, 1.4 g. (9.2 mMol) of (+)-trans-p-menthadien-(2,8)-ol-(1) and 175 mg. (0.92 mMol) of p-toluene sulphonic acid monohydrate in 60 ml. of benzene is heated under reflux for 2 ¼ hours. The resulting solution is cooled with an ice-water bath and dissolved in diethyl ether. The ether solution is immediately shaken once with a dilute sodium hydrogen carbonate solution and once with a sodium chloride solution. The solution is then dried over sodium sulphate and after evaporation of the ether there remains 3.4 g. of a light yellow oil. The resulting yellow oil is chromatographed on 70 g. of silica gel and upon elution with 1 to 1 by volume mixture of hexane and benzene and drying to constant weight, (−)-1-hydroxy-3-[3-methyloctyl(2)]-6,6,9-trimethyl-6a, 10a-trans-6a,7,10,10a-tetrhydrodibenzo(b,d)-pyran is produced. Upon distillation under high vacuum this produce has an $R_F$ value (silica gel chromatogram in chloroform) of 0.55 and a boiling point of 190° C./0.001 mmHg.

EXAMPLE 6

2.84 g. (20 mMol) of orcinol-monohydrate is mixed with 3.05 g. (20 mMol of (+)-trans-p-menthadien-(2,8)-ol-(1) in 50 ml. of benzene and 0.39g(2 mMol) of p-toluene sulphonic acid monohydrate. This mixture is heated at reflux for 2 hours. The resulting reaction solution is added to 50 ml. of diethyl ether and extracted once with a dilute sodium bicarbonate solution. The ether phase is dried over sodium sulphate and the ether is evaporated. There results 5.6 g. of a yellow oil which is chromatographed on 180 g. of silica gel and eluted with benzene. The eluted solution is distilled at high vacuum yielding 2350 mg. of (−)-1-hydroxy-3,6,6,9-tetramethyl-6a,10a-trans-6a,7,10,10a-tetrahydrodibenzo(b,d)-pyran. This compound has an $R_F$ value of 0.48 and a boiling point of 130°–140° C./0.001 mmHg.

EXAMPLE 7

A solution of 0.427 g. (2.37 mMol) of olivetol and 0.356 g. (2.34 mMol) of (+)-trans-p-menthadien-(2,8)-ol-(1) in liquid sulphur dioxide is allowed to stand at room temperature for 70 hours in a sealed tube. Thereafter, the solvent medium is carefully distilled off. The residue is dissolved in 50 ml. of diethyl ether. The ether solution is extracted once with a dilute sodium bicarbonate solution. After extraction, the ether solution is dried and evaporated. The dry residue (0.74 g.), which is obtained is chromatographed on silica gel and eluted.

One obtains after distillation utilizing a high vacuum, 142 mg. of (−)-1-hydroxy-3-n-amyl-6,6,9-trimethyl-6a,10a-trans-6a, 7,10,10a-tetrahydrodibenzo(b,d)-pyran. This compound has an $R_F$ value (silica gel thin layer chromatogram in chloroform) of 0.51 and a boiling point of 140°–150° C./0.001 mmHg.

EXAMPLE 8

0.595 g. (3.3 mMol) olivetol is mixed with 0.502 g. (3.3 mMol) (+)-cis-p-menthadien-(2,8)-ol-(1) in 8 ml. of liquid sulphur dioxide. This mixture is allowed to stand at room temperature for 120 hours in a sealed tube. After working up the mixture in the manner described in Example 1, 1.085 g. of an oily residue is obtained. The oil is chromatographed over silica gel and eluted. Upon distillation in high vacuum, 215 mg. of (−)-1-hydroxy-3-n-amyl-6,6,9-trimethyl-6a,10a-trans-6a,7,10,10a-tetrahydrodibenzo(b,d)-pyran is obtained. This compound has an $R_F$ value (silica gel thin layer chromatogram in chloroform) of 0.52 and a boiling point of 140°–150° C./0.001 mmHg.

EXAMPLE 9

A mixture of 0.54 g. (3 mMol) of olivetol, 0.46 g. (3 mMol) of (+)-trans-p-menthadien-(2,8)-ol-(1) and 0.5 ml. of trifluoro acetic acid in 50 ml. of benzene is refluxed for 5 hours. The resulting solution is worked up in the manner of Example 2 to yield 0.95 g. of a residue. The resulting residue is chromatographed on silica gel and upon elution and distillation at high vacuum yields 520 mg. of (−)-1-hydroxy-3-n- amyl-6,6,9-trimethyl-6a,10a-trans-6a,7,10,10a-tetrahydrodibenzo (b,d)9pyran. This compound has an $R_F$ value (silica gel thin layer chromatogram in chloroform) of 0.52 and a boiling point of 140°–150° C./0.001 mmHg.

EXAMPLE 10

A mixture of 2.2 g. (20 mMol) of crystalline resorcinol, 3.05 g. (20 mMol) (+)-trans-p-menthadien-(2,8) -ol-(1) and 0.4 g. (2 mMol) of p-toluene sulphonic acid monohydrate in 50 ml. of benzene is heated under reflux for 2 hours. The resulting solution is dissolved in 50 ml. of diethyl ether. The ether is extracted once with dilute sodium bicarbonate solution. The ether phase is dried and evaporated. 5.1 g. of a yellow oil is obtained. This oil is chromatographed on 250 g. of silica gel and eluded with benzene. After distilling off the benzene under high vacuum, there is obtained 778 mg. of (−)-1-hydroxy-6,6,9-trimethyl-6a,10a-trans-6a,7,10,10a-tetrahydrodibenzo(b,d)-pyran. This compound has an $R_F$ value (silica gel thin layer chromatogram in chloroform) of 0.35 and a boiling point of 155° C./0.001 mmHg.

EXAMPLE 11

A. Preparation of (−)-1-hydroxy-3-n-amyl-6,6,9-trimethyl-6a,10a-trans-6a,7,8,10a-tetrahydro-dibenzo(b,d)-pyran 1.080 g. (3.1 mMol) of oily (−)-1-hydroxy-3-n-amyl-9-chloro-6,6,9-trimentyl-6a,10a-trans-6a,7,8,9,10,10a-hexahydro-dibenzo(b,d)-pyran is dissolved in 15 ml. of absolute benzene. The resulting solution is added dropwise under stirring and under an atmosphere of argon to a 10 ml. solution of 1-M potassium t-amylate in absolute benzene which is cooled to 5° C. After the dropwise addition, the yellow reaction solution is heated for 15 min. at 65° C. and then cooled with ice. After the solution is cooled, carbon dioxide is fed into the solution for approximately 30 minutes causing a partial decolorization of the solution. The solution is partitioned between 80 ml. of ether and 80 ml. of ice water, the pH of the solution being neutralized to 7 by addition of a sodium bicarbonate solution. The ether phase is dried over sodium sulphate and evaporated. After drying in high vacuum at 0.001 mmHg there remains 970 mg. (−)-1-hydroxy-3-n-amyl-6,6,9 -trimethyl-6a,10a-trans-6a,7,8,10a-tetrahydro-dibenzo(b,d)-pyran. $[\alpha]_D^{20} = -150,5° (c = 0.53/CHCl_3)$ B. Preparation of (−)-1-hydroxy -3-n-amyl-9-chloro-6,6,9-trimethyl-6a,10a-trans-6a,7,8,9,10,10a-hexahydrodibenzo(b,d)-pyran The (−)-1-hydroxy-3-n-amyl-9-chloro-6,6,9-trimethyl-6a,10a-trans-6a,7,8,9,10,10a-hexahydro-dibenzo(b,d)-pyran used as the starting product is manufactured as follows:

A solution of 1.046 g. (3.3 mMol) of oily (−)-1-hydroxy-3-n-amyl-6,6,9-trimethyl-6a,10a-trans-6a,7,10,10a-tetrahydro-dibenzo (b,d)-pyran which has been dried in high vacuum in 20 ml. of absolute methylene chloride is treated with 300 mg. of anhydrous zinc chloride. The colorless mixture is saturated with hydrogen chloride at 0° in a dried apparatus and closed overnight at room temperature and allowed to react with stirring. All of the oil has gone into solution after 15 hours. The now deep yellow solution has added thereto 80 ml. of methylene chloride. After addition, this mixture is treated once with 80 ml. of ice-water and then with sodium bicarbonate solution up to incipient precipitation of zinc hydroxide. After this treatment, the mixture is extracted once with 50 ml. of water. The almost colorless methylene chloride phase is dried over sodium sulphate and evaporated at room temperature. After drying in high vacuum, there is produced 1.120 g. of oily (−)-1-hydroxy-3-n-amyl-9-chloro-6,6,9-trimethyl-6a,10a-trans-6a,7,8,9,10,10a-hexahydro-dibenzo(b,d)-pyran. $[\alpha]_D^{20} = -78,5° (c = 0,28$ in chloroform$)$

EXAMPLE 12

1.00 g. of (−)-1-hydroxy-3-[hexyl(2)]-9-chloro-6,6,9-trimethyl-6a,10a-trans-6a,7,8,9,10,10a-hexahydro-dibenzo(b,d)-pyran is dissolved in 10 ml. of absolute benzene. This solution is added dropwise under an atmosphere of argon to 10 ml. of 1-M potassium t-amylate in absolute benzene, cooled to a temperature of 5°. After this dropwise addition, the resulting yellow solution is heated for 15 min. at 65° C. and then cooled wit ice. After cooling, carbon dioxide is fed into the solution for approximately 30 minutes, causing a partial decolorization of the solution. The solution is then partitioned between 80 ml. of ether and 80 ml. of ice-water, the pH of the solution being neutralized to 7 by addition of a sodium bicarbonate solution. The ether phase is dried over sodium sulphate and evaporated. After drying in high vacuum at 0.001 mm., there resulted 0,90 g (−)-1-hydroxy-3-[hexyl(2)]-6,6,9-trimethyl-6a,10a-trans-6a,7,8,10a-tetrahydro-dibenzo(b,d)-pyran. $[\alpha]_D^{20} = -146° (c=0,46$ in ethanol$)$.

The (−)-1-hydroxy-3-[hexyl(2)]-9-chloro-6,6,9-trimethyl-6a,10a-trans-6a,7,8,9,10,10a-hexahydro-dibenzo(b,d)-pyran used as a starting material is manufactured according to the procedure in Example 11-B from (−)-1-hydroxy-3-[hexyl(2)] -6,6,9-trimethyl-6a,10a-trans-6a,7,10,10a-tetrahydrodibenzo(b,d)-pyran, by treatment with zinc chloride and hydrochloric acid in methylene chloride. This product exhibits the following characteristic data: $[\alpha]_D^{20} = -73.0° (c = 2.3$ in chloroform$)$.

EXAMPLE 13

(−)-1-hydroxy-3-]3-methyl octyl(2)]-9-chloro-6,6,9-trimethyl 6a,10a-trans-6a,7,8,9,10,10a-hexahydro-dibenzo(b,d)-pyran is converted by the procedure of Example 12 into (−)-1-hydroxy-3[3-methyloctyl(2)]-6,6,9-trimethyl-6a,10a-trans-6a,7,8,10a-tetrahydro-dibenzo(b,d)-pyran: $[\alpha]_D^{20} = -128.0° (c = 0.49$ in ethanol$)$.

The starting material (−)-1-hydroxy-3-[3-methyloctyl(2)]-9-chloro-6,6,9-trimethyl-6a,10a-trans-6a,7,8,9,10,10a-hexahydrodibenzo(b,d)-pyran, is prepared from (−)-1-hydroxy-3 -[3-methylcotyl(2)]-6,6,9-trimethyl-6a,-methyloctyl(a-trans-6a,7,10,10a-tetrahydrodibenzo-(b,d)-pyran, utilizing zinc chloride and hydrochloric acid in methylene chloride by means of the procedure outlined in part B of Example 11. The physical constants for this starting material are: $[\alpha]_D^{20} = -62.0°. (c = 0.39$ in chloroform$)$.

EXAMPLE 14

300 mg. of oily (−)-1-hydroxy-3[2-methylhexyl-(2)-9-chloro-6,6,9-trimethyl-6a,10a-trans-6a,7,8,9,10,10a-hexahydro-dibenzo (b,d)-pyran is dissolved in 5 ml. of absolute benzene. The thus obtained solution is added dropwise under constant stirring to 5 ml. of a solution of 1-M potassium-t-amylate dissolved in benzene. During the dropwise addition, the solution of potassium-t-amylate is maintained under an atmosphere of argon. After this addition, a dark red solution is obtained. The resulting mixture is heated to 65° C. for 15 minutes, then cooled with ice and at this temperature, carbon dioxide is bubbled into the solution for approx. 30 minutes. A partial decolorization of the solution occurs after this addition. After this addition, the solution is extracted with ether. The ether phase is dried and evaporated. After drying in high vacuum at 0.001 mmHg for 12 hours at 20° C. there remains 271 mg. of (−)-1-hydroxy-3[2-methylhexyl-(2)]-6,6,9-trimethyl-6a,10a-trans-6a,7,8,10a-tetrahydro-dibenzo(b,d)-pyran. $[\alpha]_D^{20} = -171.3° (c = 0.29$ in chloroform$)$.

The starting material (−)-1-hydroxy-3-[2-methylhexyl-(2)]-9-chloro-6,6,9-trimethyl-6a,10a-trans-6a,7,8,9,10,10a-hexahydrodibenzo(b,d)-pyran is prepared by the following procedure:

A mixture of 350 mg. of 2-(3,5-dihydroxyphenyl)-2-methylhexane, 260 mg. (+)-trans-p-menthadien-(2,8)-ol-(1) in 20 ml. of benzene is boiled under reflux with 40 mg. of p-toluene sulphonic acid monohydrate for 2 ¼ hours. The reaction solution is thereafter cooled with ice. A small amount of an aqueous solution of sodium bicarbonate is added to the cooled reaction solution. The condensation product is extracted from the reaction solution with diethyl ether. The extract is dried and evaporated. After drying and evaporating, 640 mg. of a yellow oil remains. The yellow oil, which is obtained, is chromatographed on 20 g. of silica gel. Upon elution with benzene and distillation at high vacuum there is obtained 535 mg. of (−)-1-hydroxy-3-[2-methylhexyl-(2)]-6,6,9-trimethyl-6a,10a-trans-6a,7,10,10a-tetrahydro-dibenzo(b,d)-pyran. The $R_F$ value of the tetrahydro-dibenzo pyran obtained is 0.59 (silica gel thin layer chromatogram in chloroform). The boiling point of this compound is 170° C./0.001 mmHg.

330 mg. of oily (−)-1-hydroxy-3-[2-methylhexyl-(2)]-6,6,9-trimethyl-6a,10a-trans-6a,7,10,10a-tetrahydro-dibenzo(b,d)-pyran is dissolved in 25 ml. of absolute methylene chloride. To this solution there is added 100 mg. of anhydrous zinc chloride. The mixture is saturated with hydrogen chloride at 0° C. The apparatus containing this mixture is closed and the saturated mixture is allowed to react overnight while it is maintained under constant stirring and at room temperature. After this period, the reaction solution is diluted with methylene chloride and then treated with ice water. After treating with ice water, sodium bicarbonate solution is added to the mixture in an amount up to the incipient precipitation of the zinc hydroxide. The methylene chloride phase is dried and evaporated. After drying in high vacuum, 0.001 mmHg. at 20° C. for 12 hours, there remains 362 mg. of (−)-1-hydroxy-3-[2-methylhexyl-(2)]-9-chloro-6,6,9-trimethyl-6a,10a-trans-6a,7,8,9,10,10a-hexahydro-dibenzo(b,d)-pyran. This pyran has an $R_F$ value (silica gel thin layer chromatogram in chloroform) of 0.63 and $[\alpha]_D^{20} = -70.5°$ ($c = 0.69$ in chloroform).

EXAMPLE 15

A solution containing 140 mg. (−)-1-hydroxy-3,9-dichloro-6,6,9-trimethyl-6a,10a-trans-6a,7,8,9,10,10a-hexahydro-dibenzo(b,d)-pyran in 5 ml. of absolute benzene is added dropwise under an atmosphere of argon to a 2 ml. solution of 1-M potassium-t-amylate in absolute benzene. The solution of potassium-t-amylate is maintained at 5° C. and constantly stirred during the addition. After the addition is complete, the mixture is warmed to 65° C. for 15 minutes. The resulting orange solution is cooled with ice and carbon dioxide is subsequently bubbled therein for approximately 30 minutes. During the addition of the carbonic acid, decolorization of the solution occurs. Thereafter, the solution is extracted with ether. The ether extract is neutralized to a pH of 7 by the addition of a sodium bicarbonate solution. The ether phase is dried over the sodium sulfate and evaporated. After drying in high vacuum at 0.001 mmHg there is produced 123 mg. of (−)-1-hydroxy-3-chloro-6,6,9-trimethyl-6a,10a-trans-6a,7,8,10a-tetrahydro-dibenzo(b,d)-pyran. This pyran has an $R_F$ value of 0.33 (silica gel thin layer chromatogram in chloroform) and $[\alpha]_D^{20} = -166.2°$. ($c = 0.35$ in chloroform).

The starting material (−)-1-hydroxy-3,9-dichloro-6,6,9-trimethyl-6a,10a-trans-6a,7,8,9,10,10a-hexahydro-dibenzo(b,d)-pyran is produced by the following procedure.

280 mg. of 5-chloro-resorcinol is mixed with 300 mg. of (+)-trans-p-menthadien-(2,8)-ol-(1) dissolved in 20 ml. of benzene. This mixture is refluxed for 2 hours with 40 mg. of p-toluene-sulphonic acid monohydrate. Thereafter, the solution is cooled in ice. After cooling the solution in ice, diethyl ether and a dilute sodium bicarbonate solution are added thereto. The ether phase which results is dried and evaporated. The resulting residue is chromatographed on 30 g. of silica gel and upon elution with benzene and distillation at high vacuum there is obtained 130 mg. of (−)-1-hydroxy-3-chloro-6,6,9-trimethyl-6a,10a-trans-6a,7,10,10a-tetrahydro-dibenzo(b,d)-pyran. This pyran has a boiling point of 170° C./0.001 mmHg and an $R_F$ value (silica gel thin layer chromatogram in chloroform) of 0.35; $[\alpha]_D^{20} = -278°$. ($c = 0.13$ in chloroform).

150 mg. of (−)-1-hydroxy-3-chloro-6,6,9-trimethyl-6a,10a-trans-6a,7,10,10a-tetrahydro-dibenzo(b,d)-pyran dissolved in 20 ml. of absolute methylene chloride has 50 mg. of anhydrous zinc chloride added thereto. The resulting mixture is saturated with hydrogen chloride at 0° C. This saturated mixture is allowed to remain overnight at room temperature. The resulting yellow solution is diluted with methylene chloride. The diluted solution is treated once with sodium bicarbonate solution in an amount up to the incipient precipitation of zinc hydroxide. Following the extraction, the resulting organic phase is dried and evaporated. After drying at high vacuum, 171 mg. of (−)-1-hydroxy-3,9-dichloro-6,6,9-trimethyl-6a,10a-trans-6a,7,8,9,10,10a-hexahydro-dibenzo(b,d)-pyran is obtained.

EXAMPLE 16

790 mg. of (−)-1-hydroxy-3,6,6,9-tetramethyl-9chloro-6a,10a-trans-6a,7,8,9,10,10a-hexahydro-dibenzo(b,d)-pyran dissolved in 15 ml. of absolute benzene is added dropwise to a solution of 10 ml. of 1-M potassium t-amylate in absolute benzene. This addition is carried out under an atmosphere of argon while the potassium t-amylate solution is constantly stirred and cooled by means of ice water. After the addition, the reaction solution is heated for 15 min. to a temperature of from 65°–70° C. After cooling with ice, carbon dioxide is bubbled into the solution for approximately 30 minutes. The mixture is partitioned between ether and ice water. The pH of the mixture is neutralized to 7 by the addition of a sodium bicarbonate solution. The ether phase is dried and distillation under high vacuum produces 690 mg. of (−)-1-hydroxy-3,6,6,9-tetramethyl-6a,10a-tetrahydro-dibenzo(b,d)-pyran. This product is in the form of a yellow oil with an $R_F$ value (silica gel thin layer chromatogram in chloroform) of 0.46 and a boiling point of 160° C./0.001 mmHg $[\alpha]_D^{20} = -229°$ ($c =0.4/CHClb3$).

The starting material (−)-1-hydroxy-3,6,6,9-tetramethyl-9-chloro-6a,10a-trans-6a,7,8,9,10,10a-hexahydro-dibenzo(b,d)-pyran is produced in the manner of part B of Example 11 from (−)-1-hydroxy-3,6,6,9-tetramethyl-6a,10a-trans-6a,7,10,10a-tetrahydrodibenzo(b,d)-pyran. This starting material has $[\alpha]_D^{20} = -98.4°$ ($c = 0.25/CHCl_3$).

I claim:

1. A process for preparing a dibenzo-pyran of the formula:

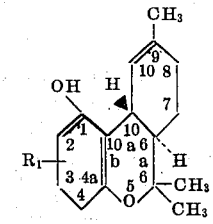

wherein $R_1$ is hydrogen, halogen, or alkyl containing from one to 10 carbon atoms, comprising treating in an inert aromatic solvent, a compound of the formula:

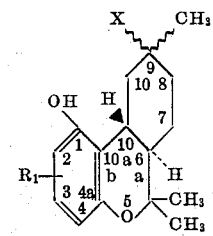

wherein X is a halogen and $R_1$ is as above, with potassium t-amylate.

2. The process of claim 1 wherein said treating step is carried out by heating to a temperature of from 50° to 70° C.
3. The process of claim 1 wherein X is chlorine.
4. The process of claim 1 wherein $R_1$ is n-amyl.
5. The process of claim 1 wherein said solvent is benzene.

6. The process of claim 1 wherein said solvent is toluene.

7. The process of preparing a 6a,7,8,10a-tetrahydro-dibenzo-pyran of the formula:

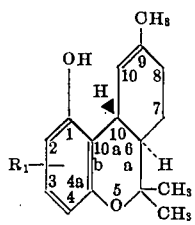

wherein $R_1$ is hydrogen, halogen, or alkyl containing from one to 10 carbon atoms, comprising treating a compound of the formula:

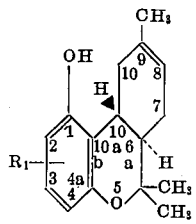

wherein $R_1$ is as above,
with a metal halide in an inert halogenated hydrocarbon solvent, wherein said solvent is saturated with a hydrohalic acid having the same halo group as the halo group of said metal halide to form a halo-dibenzo-pyran and treating the halo-dibenzo-pyran with potassium t-amylate in an aromatic hydrocarbon solvent to form said 6a,7,8,10a-tetrahydrodibenzopyran.

8. The process of claim 7 wherein said metal halide is zinc chloride and the halogenated hydrocarbon solvent is methylene chloride saturated with hydrochloric acid.

9. The process of claim 7 wherein said metal is a Group II, Group III or Group IV metal.

10. The process of claim 7 wherein $R_1$ is n-amyl substituted in the three-position of the dibenzopyran ring.

11. The process of claim 7 wherein $R_1$ is methyl.

* * * * *

PO-1050
(5/69)

UNITED STATES PATENT OFFICE
CERTIFICATE OF CORRECTION

Patent No. 3,668,224                              Dated September 6, 1972

Inventor(s) Theodor Petrzilka

It is certified that error appears in the above-identified patent and that said Letters Patent are hereby corrected as shown below:

First page, second column, line 5, change "Ellen" to -- Eben --;
                          line 6, Change "M. Donohue" to
                                     -- N. Donohue --;
Col. 3, line 37, change "CH" to -- $CH_3$ --;
Col. 6, line 12, change "tetrzhydrodibenzo" to
                 -- tetrahydrodibenzo --;
Col. 7, line 2, change "(b,d)9pyran" to -- (b,d)-pyran --;
Col. 7, line 27, change "trimentyl" to -- trimethyl --;
Col. 8, line 5, change "wit" to -- with --;
Col. 8, line 37, change "methylcotyl" to -- methyloctyl --;
                 change "-methyloctyl(a-trans-" to
                 -- 10a-trans- --;
Col. 8, line 45, change "[2-methylhexyl-(2)-9-" to
                 -- [2-methylhexyl-(2)]-9- --;
Col. 9, line 27, change "10-hexahydro" to -- 10a-hexahydro--;
Col. 10, line 15, change "9chloro-" to -- 9-chloro- --;
Col. 10, line 29, after "10a-" insert -- trans-6a,7,8,10a- --;
Col. 10, line 33, change "=0.4/CHClb3)." to -- =$0.4/CHCl_3$). --;
Col. 10, line 50, lowermost inside line missing from left
                  benzene ring of formula;
Col. 10, line 65, number 6 missing in lower right benzene ring;
Col. 11, line 10, number 6 missing in lower right benzene ring;
Col. 11, line 25, number 6 missing in lower right benzene ring.

Signed and sealed this 9th day of January 1973.

(SEAL)
Attest:

EDWARD M. FLETCHER, JR.                    ROBERT GOTTSCHALK
Attesting Officer                          Commissioner of Patents